Sept. 22, 1964   O. K. KELLEY   3,149,466
FLUID COUPLINGS
Original Filed Dec. 23, 1952

INVENTOR.
Oliver K. Kelley
BY
W. C. Middleton
ATTORNEY

United States Patent Office 3,149,466
Patented Sept. 22, 1964

3,149,466
FLUID COUPLINGS
Oliver K. Kelley, Bloomfield Hills, Mich., assignor to General Motors Corporation, Detroit, Mich., a corporation of Delaware
Original application Dec. 23, 1952, Ser. No. 327,568, now Patent No. 2,981,126, dated Apr. 25, 1961. Divided and this application Feb. 23, 1961, Ser. No. 91,021
17 Claims. (Cl. 60—54)

This invention relates to fluid couplings and more particularly to hydramatic fluid couplings of the type used with gearing for automotive vehicles. This application is a division of my co-pending application Serial No. 327,568, filed December 23, 1952 for Power Shifting Multi-Step Transmissions, now Patent No. 2,981,126 issued April 25, 1961.

In automotive transmissions utilizing gearing combined with a fluid coupling, it is customary to drive the pump or impeller of the fluid coupling by the source of power such as the engine of the vehicle. The turbine or runner of the coupling is usually connected to parts of the gearing in such fashion that when a torque train is established therethrough, rotation of the pump or impeller by the engine will cause drive of the turbine or runner and consequently drive of the output of the transmission to move the vehicle. If it is desired to keep the torque train established even while the engine is idling, a condition known as "creep" can occur if the coupling has torque capacity sufficient to transmit torque at low engine speed.

An object of the present invention is to provide a fluid coupling of such type that transmission of torque thereby at low input speed can be interrupted or substantially reduced.

Another object of the invention is to provide a fluid coupling of such character as to have incorporated therein means for interrupting or reducing the flow of fluid between the pump and turbine at low pump speed to interrupt or reduce the torque transmitted by the coupling.

A further object of the invention is to provide a fluid coupling having incorporated therein plungers mounted in the pump or impeller biased to impede the flow of liquid between the vanes thereof at low pump speed and centrifugally moved out of the path of flow when the pump speed reaches a predetermined value.

Figure 1:
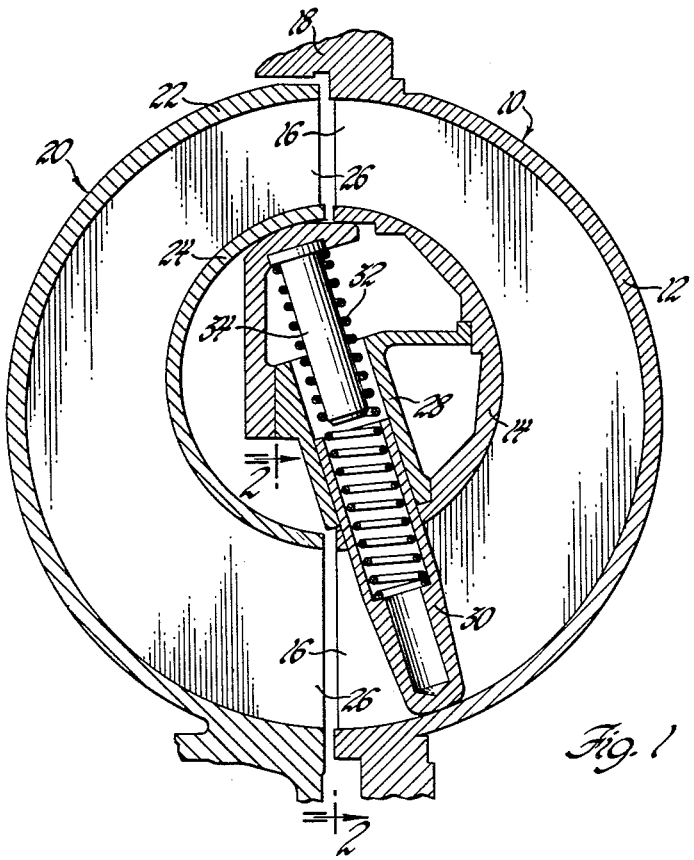
Figure 2:
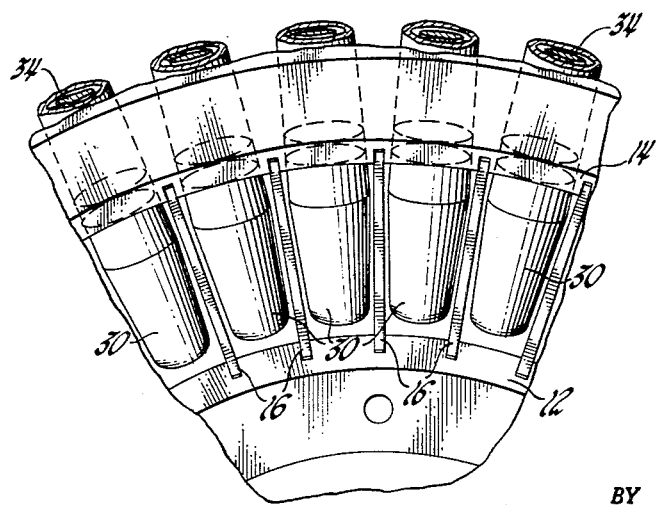

Other features, objects and advantages of the invention will become apparent from the following drawings wherein:

FIGURE 1 is a vertical section of half of a fluid coupling embodying the invention, and FIGURE 2 is a section taken substantially on the line 2—2 of FIGURE 1.

Referring now to the drawing, 10 indicates generally the pump or impeller of a fluid coupling which is to be driven by a source of power such as the engine of an automotive vehicle. The pump or impeller comprises an annular outer shroud 12, an annular inner shroud 14 and vanes or blades 16 therebetween. The outer shroud 12 may have an extension 18, a fragment of which is shown, for connection to the source of motive power. The turbine or runner indicated generally at 20 comprises an annular outer shroud 22, an annular inner shroud 24 and vanes 26 secured between the inner and outer shrouds.

The pump 10 has a cage 28 attached to the inner shroud 14 for rotation with the pump. A number of plungers 30 are mounted in tubular bores of the cage as shown in the drawing for sliding movement therein. The plungers 30 normally are spring-pressed toward the inner part of the outer shroud 10 by springs 32. These springs 32 have parts thereof surrounding stationary pegs 34 secured in the cage 28 and parts thereof fitting within the hollowed out plungers 30. The number of plungers used in the coupling may vary depending on the speed at which it is desired the coupling to transmit torque. As shown in FIGURE 2, a plunger 30 is positioned between each adjacent pairs of pump blades 16.

The springs 32 are of such character that they will maintain the plungers 30 in the position shown in the drawings when the pump 10 is stationary and also when it is rotating at a relatively slow speed such as idling speed of the engine. These plungers occupy such space between adjacent pump blades as to materially interrupt or reduce the circulation of liquid between the pump 10 and the turbine 20. It will be obvious that while liquid can be discharged from the pump 10 at the outer portion thereof into the turbine 20, the plungers will interfere with return of fluid from the turbine to the pump. However, when the pump 10 is driven at a predetermined speed, such as when the engine is accelerated to drive the vehicle, centrifugal force will cause the plungers 30 to slide outwardly in their respective bores in cage 28 against the resistance of the springs 32. These plungers can be caused to slide into position wherein they are retained entirely within the cage and offer no impediment to fluid circulation between the pump and the turbine.

From the foregoing it will be seen that the present invention provides novel means for controlling the transmission of torque by a fluid coupling so that at low pump speed, corresponding to engine idling speed, substantially no torque will be transmitted by the coupling while at engine speed high enough to drive the vehicle, such transmission of torque is not effected.

The invention is to be limited only by the scope of the following claims.

I claim:

1. In a fluid drive for transmitting torque, a driving member, a driven member, a bladed pump rotor connected to the driving member and a bladed turbine rotor connected to the driven member and mounted for rotation, said pump and turbine rotors having inner and outer shrouds defining toroidal fluid flow passages between said shrouds and said blades, the fluid flow passages of said turbine rotor receiving liquid from the fluid flow passages of said pump rotor and returning liquid to said pump rotor, and blocking means including a blocking member mounted on a rotor for movement between a first position at least partially blocking said fluid flow passages and a second position substantially within said inner shrouds unblocking said fluid flow passages, biasing means mounted on a rotor and located in all positions entirely within said outer shrouds for engaging said blocking member to urge said blocking member from one to another of said positions and centrifugal force responsive means mounted on a rotor and located in all positions entirely within said outer shrouds for moving said blocking member from said another position to said one position.

2. The invention defined in claim 1 and said movement of said blocking member being straight line reciprocating movement.

3. The invention defined in claim 1 and said first position of said blocking member which is mounted on a rotor being nearer the axis of rotation of said rotor than said second position.

4. The invention defined in claim 1 and said first position of said blocking member which is mounted on a rotor being nearer the axis of rotation of said rotor than said second position and said centrifugal force responsive means being the mass of said blocking member.

5. The invention defined in claim 1 and said blocking member, said biasing means and said centrifugal force responsive means in said second position of said blocking member being located entirely within said inner shrouds.

6. The invention defined in claim 1 and said blocking member, said biasing means and said centrifugal force responsive means being mounted on one rotor.

7. In a fluid drive for transmitting torque, a driving member, a driven member, a bladed pump connected to the driving member and a bladed turbine connected to the driven member and mounted for rotation, said pump and turbine having inner and outer shrouds defining toroidal fluid flow passages between said shrouds and said blades, the fluid flow passages of said turbine receiving liquid from the fluid flow passages of said pump and returning liquid to said pump, and blocking means including a blocking member mounted on said pump for movement between a first position at least partially blocking said fluid flow passages and a second position substantially within said inner shrouds unblocking said fluid flow passages, biasing means mounted on said pump and located in all positions entirely within said outer shrouds for engaging said blocking member to urge said blocking members from one to another of said positions and centrifugal force responsive means mounted on said pump and located in all positions entirely within said outer shrouds for moving said blocking member from said another position to said one position.

8. The invention defined in claim 7 and said first position of said blocking member being nearer the axis of rotation of said pump than said second position.

9. The invention defined in claim 7 and said first position of said blocking member being nearer the axis of rotation of said pump than said second position and said centrifugal force responsive means being the mass of said blocking member.

10. The invention defined in claim 7 and said blocking member, said biasing means and said centrifugal force responsive means in said second position of said blocking member being located entirely within said inner shrouds.

11. In a fluid drive for transmitting torque, a driving member, a driven member, a bladed pump connected to the driving member and a bladed turbine connected to the driven member and mounted for rotation, said pump and turbine having inner and outer shrouds defining toroidal fluid flow passages between said shrouds and said blades, the fluid flow passages of said turbine receiving liquid from the fluid flow passages of said pump and returning liquid to said pump, and blocking means including a blocking member mounted on said pump for movement between a first position at least partially blocking said fluid flow passages and a second position substantially within said inner shrouds unblocking said fluid flow passages, biasing means mounted on said pump located in all positions entirely within said outer shrouds for engaging said blocking member to urge said blocking members from said second position to said first position and centrifugal force responsive means mounted on said pump and located in all positions entirely within said outer shrouds for moving said blocking member from said first position to said second position.

12. The invention defined in claim 11 and said blocking member, said biasing means and said centrifugal force responsive means in said second position of said blocking member being located entirely within said inner shrouds.

13. In a fluid drive for transmitting torque, a driving member, a driven member, a bladed pump connected to the driving member and a bladed turbine connected to the driven member and mounted for rotation about an axis, said pump and turbine having inner and outer shrouds defining toroidal fluid flow passages between said shrouds and said blades, the fluid flow passages of said turbine receiving liquid from the fluid flow passages of said pump and returning liquid to said pump, and blocking means including a blocking member mounted on said pump for substantially radial movement with respect to said axis of rotation between a first position at least partially blocking said fluid flow passages and a second position substantially within said inner shrouds, unblocking said fluid flow passages, said first position being nearer said axis of rotation than said second position, biasing means mounted on said pump located in all positions entirely within said outer shrouds for engaging said blocking member to urge said blocking members from said second position to said first position and centrifugal force responsive means mounted on said pump and located in all positions entirely within said outer shrouds for moving said blocking member from said first position to said second position.

14. The invention defined in claim 13 and said centrifugal force responsive means being the mass of said blocking members.

15. The invention defined in claim 13 and said block member in said second position being entirely within said inner shrouds.

16. The invention defined in claim 13 and said blocking member being mounted for reciprocating movement in a straight line.

17. The invention defined in claim 13 and said blocking member, said biasing means and said centrifugal force responsive means in said second position of said blocking member being located entirely within said inner shrouds.

References Cited in the file of this patent

UNITED STATES PATENTS

| | | |
|---|---|---|
| 1,863,128 | Salerni | June 14, 1932 |
| 2,096,070 | Sinclair | Oct. 19, 1937 |
| 2,347,121 | Patterson | Apr. 18, 1944 |
| 2,367,364 | Miller | Jan. 16, 1945 |
| 2,862,362 | Parshall | Dec. 2, 1958 |

FOREIGN PATENTS

| | | |
|---|---|---|
| 519,968 | Great Britain | Apr. 10, 1940 |
| 912,898 | Germany | June 3, 1954 |
| 1,091,161 | France | Oct. 27, 1954 |